United States Patent [19]

Leon-Vieito

[11] Patent Number: 5,509,638
[45] Date of Patent: Apr. 23, 1996

[54] HOIST WITH AN ELASTIC CABLE

[76] Inventor: Pedro Leon-Vieito, 2206 SW. 60 Ave., Miami, Fla. 33155

[21] Appl. No.: 335,234

[22] Filed: Nov. 7, 1994

[51] Int. Cl.⁶ .................................. B66D 1/50; B66D 1/12
[52] U.S. Cl. .................. 254/270; 254/277; 254/336; 254/362
[58] Field of Search .......................... 254/270, 272, 254/273, 277, 334, 335, 336, 337, 338, 362

[56] References Cited

U.S. PATENT DOCUMENTS

| | | | |
|---|---|---|---|
| 1,345,881 | 7/1920 | Purnell et al. | 254/338 X |
| 1,978,999 | 10/1934 | Jones | 254/334 |
| 2,136,596 | 11/1938 | Smith | 254/277 X |
| 2,859,881 | 11/1958 | Coryell | 254/336 X |
| 3,384,350 | 5/1968 | Powell | 254/270 |
| 3,512,657 | 5/1970 | Chambers | 254/277 X |
| 3,653,636 | 4/1972 | Burrell | 254/270 |
| 4,118,012 | 10/1978 | Kerr et al. | 254/273 X |
| 4,519,585 | 5/1985 | Furrow | 254/273 |
| 4,706,939 | 11/1987 | Gagne | 254/338 X |
| 5,240,229 | 8/1993 | Timmons | 254/335 X |

FOREIGN PATENT DOCUMENTS

| | | | |
|---|---|---|---|
| 77087 | 1/1955 | Netherlands | 254/270 |
| 318384 | 12/1969 | Sweden | 254/336 |

Primary Examiner—Joseph J. Hail, III
Attorney, Agent, or Firm—J. Sanchelima

[57] ABSTRACT

A hoist for loads that includes an elongated upright support assembly and an elongated extending support assembly pivotally mounted to the upper end of the former. The free end of the elongated radially extending assembly being able to follow a curved path in a horizontal plane. An elastic cable is attached to a non-elastic cable that is wound in a spool assembly so that the equilibrium point for the tool or equipment load can be adjusted at a vertical point. The spool is driven by an electric motor that in turn is activated by the wireless transmission of signals for winding and unwinding. These signals are produced when the tension at the end of the elastic cable attached to the load falls outside a predetermined range.

6 Claims, 2 Drawing Sheets

FIG - 1 -

HOIST WITH AN ELASTIC CABLE

BACKGROUND OF THE INVENTION

1. Field of the Invention

The present invention relates to a hoist, and more particularly, of the type that includes an elastic cable.

2. Description of the Related Art

Hoists typically include a flexible non-elastic member with a hook at the end. However, none of the hoists known to applicant includes an elastic cable or a combination of an elastic and non-elastic cable.

SUMMARY OF THE INVENTION

It is one of the primary objects of the present invention to provide an apparatus that can aid a user in lifting and suspending heavy objects.

It is another object of the present invention to provide an apparatus that is volumetrically efficient, requiring minimum storage space.

It is still another object of the present invention to provide an apparatus that permits to alleviate the vibrations received by a user of vibrating heavy objects or equipment.

It is also another object of the present invention to provide an apparatus that can be automatically monitored without any force from the user.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
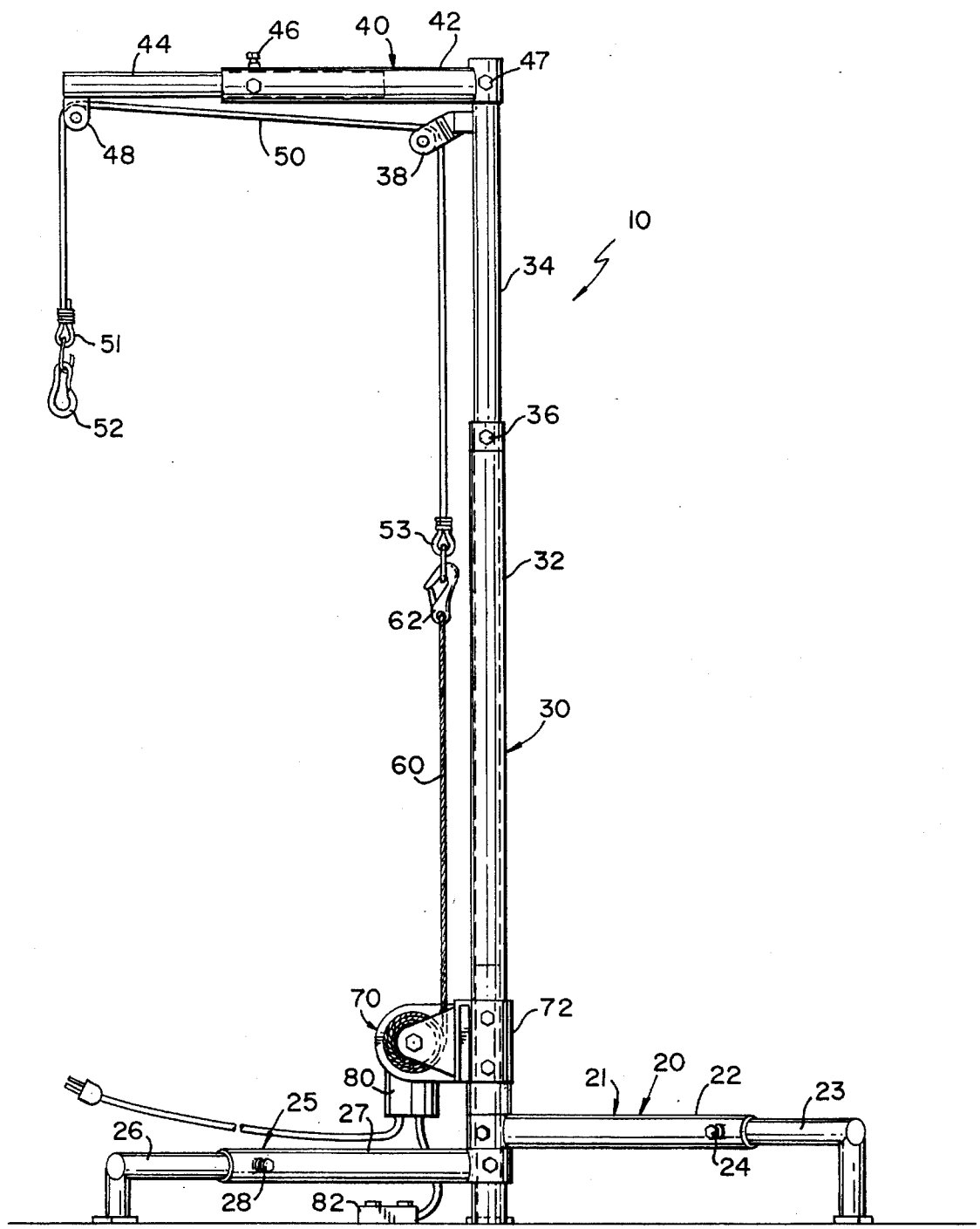
FIG. 1 represents an elevational view of the present invention.

Referring now to the drawings, where the present invention is generally referred to with numeral 10, it can be observed that it basically includes base assembly 20, elongated upright support assembly 30, elongated radially extending support assembly 40, elastic cable 50, non-elastic cable 60, spool assembly 70 and electric motor 80. In FIG. 1, electric motor 80 is selectively and manually controlled through switch assembly 82. In the alternate embodiment in FIG. 2, as it will be explained below with primed numerals, electric motor 80' is driven, wireless, depending on the tension force reading experienced by force tension sensor assembly 90'.

Elongated upright support assembly 30, in the preferred embodiment, comprises two tubular elongated members 32 and 34 that are telescopically mounted to each other. The length of assembly 30 is adjusted by inserting screw 36 through a hole of member 32. Screw 36 permits the user to establish a determined height depending on the working area. As it is seen in FIG. 1, one end of assembly 30 rests on the ground supported by base assembly 20. Base assembly 20 has, in the preferred embodiment, two legs 21 and 25 joined at one point and forming an angle of approximately 120 degrees. Tubular members 22 and 23 are mounted within each other. The same applies to tubular members 26 and 27. The length of base assembly 20, as elongated upright support assembly 30, is adjusted by screws 24 and 28. Elongated radially extending support assembly 40 is mounted to the other end of assembly 30. Elongated radially extended support assembly 40 has two tubular members 42 and 44. Tubular member 42 is mounted within tubular member 44 and these members are adjusted by screw 46.

Elastic cable 50, in the preferred embodiment, has two ends. End 53 has hook member 62 attached thereto. And, end 51 is attached to load W, i.e., heavy tools or equipment or any other object that needs to be raised and manipulated. Hook member 52 is attached to end 51 of elastic cable 50. Hook member 52 can be used to hook up to a load W(not shown). Elastic cable 50 runs through pulleys 38 and 48, which are mounted to assemblies 30 and 40 respectively.

Spool assembly 70 is designed to provide the rotation in two possible directions for non-elastic cable 60. Spool assembly 70 is located at the lower part of assembly 30 and is supported by bracket member 72, in the preferred embodiment. Electric motor 80 winds and unwinds non-elastic cable 60 depending on the desired position where a user needs to have load W(not shown).

Figures 2, 3:
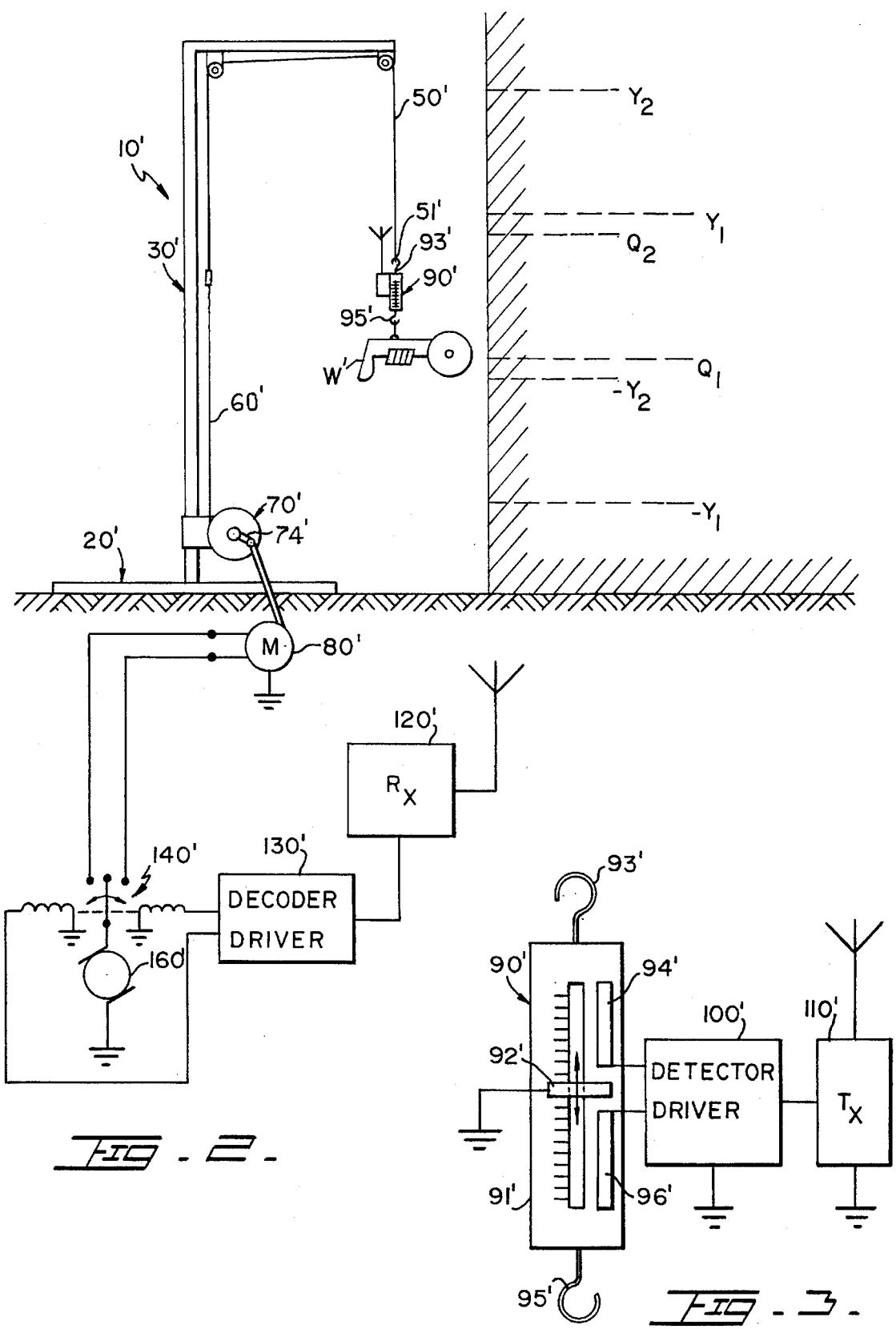
FIG. 2 shows a schematic view of the alternative embodiment using an electric sensor assembly at the end of the elastic cable.
FIG. 3 illustrates a schematic representation of the electric sensor assembly along with the output signal electric circuit, used in the present invention.

A user who works with heavy tools or requires the suspension of heavy objects (refer to as W') for a relatively long period of time, will adjust the position of load W' at plane $Q_1$, as best seen in FIG. 2. Depending on the elastic constant of elastic cable 50', a user can move load W' up and down a distance $Y_1$ and $-Y_1$, and still be within the substantially lineal portion of the equation for an elastic member: $F=k*Y$, where "F" represents force, "k" is the elastic constant and "Y" is the displacement. Beyond that range, the elastic member behaves non-lineally. Therefore, a user will need to readjust the position of load W' to plane $Q_2$, with a range that will go from $Y_2$ to $-Y_2$. To do this, a user activates spool assembly 70 (manually) or spool assembly 70' (automatically), as seen in FIGS. 1 and 2. Also, spool assembly 70' has handle member 74' and it can be operated manually by an operator, as it is shown in FIG. 2.

In FIG. 1, a user activates switch assembly 82 that in turn drives electric motor 80 and in turn the latter drives spool assembly 70 directly by hand.

In FIG. 2, housing member 91' of tension force sensor assembly 90' is attached to end 51' of elastic cable 50'. In the preferred embodiment, assembly 90' includes upper and lower hook members 93' and 95'. End 51' is attached to hook member 93'. Assembly 90' is of the dynamometer type that includes a spring member to which movable indicator 92' is mounted, thereby providing an indicator of the force applied, as best seen in FIG. 3. In equilibrium, movable indicator 92' positions itself at a point between contact pads 94' and 96'. When a user manipulates load W' by either lifting it or lowering it, he or she causes indicator 92' to move up or down. If indicator 92' moves a sufficient distance to contact either pad 94' or 96', a ground is transmitted by indicator 92' to pads 94' or 96'.

The ground signal transmitted is then detected by detector/driver circuit 100' and transmitter 110' then transmits one of two unique outputs generated by circuit 100'. Receiver 120' receives the transmission and sends it to decoder/driver circuit 130' which, depending on which of the two unique outputs are received, activates one of the two coils of two poles, double throw relay assembly 140'. In this manner, the electricity from electric power source 160' is delivered to one of the two windings of motor 80' depending on whether spool assembly 70' needs to be wound or unwound. The result being that as a user moves load W' up and down, a correction for the equilibrium plane Q follows closely.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device for lifting a load, comprising:
   A. elongated upright support means having upper and lower ends;
   B. elongated radially extending support means having first and second ends and said first end being mounted to said upper end;
   C. an elastic cable having first and second ends and the second end of said elastic cable being attached to said load;
   D. a non-elastic cable having first and second ends and the first end of said non-elastic cable being attached to the first end of said elastic cable; and
   E. spool means for winding said second end of said non-elastic cable.
2. The device set forth in claim 1 further including:
   F. means for driving said spool means.
3. The device set forth in claim 2 wherein said means driving said spool means is capable of rotating in both directions.
4. The device set forth in claim 2 further including:
   G. force sensing means attached between the second end of said elastic cable means and said load and said force sensing means that the tension applied by the weight of said load is sensed by said force sensing means further including output means for producing one of two unique outputs when the tension force applied to the second end of said elastic cable falls outside a predetermined range of tensions.
5. The device set forth in claim 4 wherein said means for driving said spool means includes an electric motor further including:
   H. means for detecting said outputs connected to said force sensing means; and
   I. means for driving said electric motor connected to said means for detecting said outputs so that said electric motor is activated to wind and unwind said non-elastic cable until the tension force applied to the second end of said elastic cable falls within said predetermined range.
6. The device set forth in claim 5, further including:
   J. transmitter means connected to said means for detecting said outputs; and
   K. receiver means connected to said means for driving said electric motor so that the transmission of said outputs is wireless between said transmitter and receiver means.

* * * * *